United States Patent
Abouelwafa et al.

(10) Patent No.: US 10,585,629 B2
(45) Date of Patent: Mar. 10, 2020

(54) STORAGE CONTROLLER SUB-LUN OWNERSHIP MAPPING AND ALIGNMENT

(71) Applicant: HEWLETT PACKARD ENTERPRISE DEVELOPMENT LP, Palo Alto, CA (US)

(72) Inventors: Ayman Abouelwafa, Folsom, CA (US); Sheridan Clark Kooyers, Star, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 32 days.

(21) Appl. No.: 15/964,744

(22) Filed: Apr. 27, 2018

(65) Prior Publication Data
US 2019/0332271 A1 Oct. 31, 2019

(51) Int. Cl.
*G06F 3/06* (2006.01)

(52) U.S. Cl.
CPC .............. *G06F 3/067* (2013.01); *G06F 3/064* (2013.01); *G06F 3/0689* (2013.01); *G06F 3/0662* (2013.01)

(58) Field of Classification Search
CPC ........ G06F 3/067; G06F 3/0689; G06F 3/064; G06F 3/0662
USPC .................................................. 711/202, 201
See application file for complete search history.

(56) References Cited

U.S. PATENT DOCUMENTS

| | | | |
|---|---|---|---|
| 6,996,691 B2 | 2/2006 | Sicola et al. | |
| 7,650,446 B2 | 1/2010 | Nonaka et al. | |
| 8,219,715 B2 | 7/2012 | Zwisler et al. | |
| 8,307,240 B2 | 11/2012 | Fredin et al. | |
| 8,332,549 B2 | 12/2012 | Spry et al. | |
| 9,021,499 B2 | 4/2015 | Mopur et al. | |
| 9,182,918 B2 | 11/2015 | Jibbe et al. | |
| 9,575,690 B2 | 2/2017 | Burton et al. | |
| 9,575,905 B2 | 2/2017 | Viswanatha | |
| 2007/0156958 A1* | 7/2007 | Misra | G06F 11/1451 711/114 |
| 2011/0004707 A1 | 1/2011 | Spry et al. | |
| 2011/0225371 A1 | 9/2011 | Spry | |
| 2013/0067138 A1* | 3/2013 | Schuette | G06F 3/0616 711/103 |
| 2013/0212349 A1 | 8/2013 | Maruyama | |

(Continued)

FOREIGN PATENT DOCUMENTS

EP 2196894 3/2013

OTHER PUBLICATIONS

George Penokie, "T10/09-241 revision 6," Jan. 18, 2010, Subject: SBC-3: SPC-4; SAM-5; SCSI Referrals.

(Continued)

*Primary Examiner* — Hong C Kim
(74) *Attorney, Agent, or Firm* — Hewlett Packard Enterprise Patent Department (57) ABSTRACT

A sub-LUN ownership mapping for multiple storage controllers of a first storage array is generated. The sub-LUN ownership mapping indicates ownership of sub-LUNs by the multiple storage controllers of the first storage array. The sub-LUN ownership mapping is transmitted to a storage controller of a second storage array. A request to align sub-ownership is sent to the storage controller of the second storage array. Ownership is aligned for one or more sub-LUNS for multiple storage controllers of the second storage array.

20 Claims, 5 Drawing Sheets (56) References Cited

U.S. PATENT DOCUMENTS

2013/0326545 A1    12/2013  Bavishi et al.
2015/0370489 A1*   12/2015  Shaikh ................ G06F 12/0261
                                                            718/1
2016/0112512 A1*    4/2016  Jibbe ....................... G06F 3/061
                                                            709/219
2019/0121709 A1*    4/2019  Abouelwafa ....... G06F 11/2056

OTHER PUBLICATIONS

Morris, M., "VNX—Workload Balancing," (Web Page), Dec. 20, 2011, 2 pages, https://community.emc.com/docs/DOC-13355.

* cited by examiner

STORAGE CONTROLLER SUB-LUN OWNERSHIP MAPPING AND ALIGNMENT

BACKGROUND

In storage array systems, host accessible volumes or logical unit numbers (referred to herein as "LUNs") are each formed from a collection of sub-LUNs. Each sub-LUN may be owned (or hosted) by a storage controller of the storage array. Ownership of various sub-LUNs that make up a LUN may be distributed across multiple different storage controllers of a storage array. When a storage controller owns a sub-LUN, the storage controller is responsible for data operations, such as read/write and input/output operations, to and from a physical or virtual storage device having physical storage that is or may be allocated to the sub-LUN for storage of data the (virtual or logical) sub-LUN. The sub-LUN serves as a logical pointer to one or more storage devices where data is stored. A storage controller handles data access to physical storage media for a sub-LUN. The physical storage media may be comprised of any suitable physical storage media such as hard disk drive(s) (HDD(s)), solid state drive(s) (SSD(s)) such as flash drives for example, or other storage devices, or a combination thereof.

A distributed storage system may include multiple storage arrays where the LUNs and the data in the storage arrays are kept in sync or are remotely copied from one storage array to another storage array. Often, however, sub-LUNs may be misaligned among storage controllers of the different storage arrays. For example, a single storage controller in a first storage array may be responsible for data operations for two or more sub-LUNs. In a remote second storage array, these sub-LUNs may be distributed among two or more storage controllers.

This sub-LUN misalignment among the storage controllers of first and second storage arrays may cause data transfer inefficiencies, especially in the case of remote copy operations of data from one storage array to another storage array. A storage controller may need to proxy data operation requests from one controller to another controller of a storage array. The proxying of data operation requests may be performed via controller inter-links and may result in a negative performance impact to a storage array due to limited inter-controller bandwidth, and/or the latency imposed by the time needed to process the data operation request from one storage controller to another storage controller within a storage array.

SUMMARY OF THE DISCLOSURE

Examples of the present disclosure are directed to a system for sub-LUN alignment among a plurality of storage controllers of a storage array, and related methods and non-transitory computer storage device storing instructions operable to cause one or more processors to perform the methods.

The methods herein may be implemented by one or more processors of a storage controller executing software instructions stored on a non-transitory machine-readable storage medium (or computer readable medium), by control circuitry integrated within a storage controller, or by a host computer that may control or interact with storage controllers, or any combination thereof. A processor generates a first sub-LUN ownership mapping for a plurality of storage controllers of a first storage array. The first sub-LUN ownership mapping indicates ownership of sub-LUNs for the plurality of storage controllers of the first storage array. The sub-LUN ownership mapping may comprise an electronic data file identifying a plurality of storage controllers and the respective sub-LUNs the storage controller owns for data operation requests, such as read/write operations.

The first sub-LUN ownership mapping is transmitted to a storage controller of a second storage array. The second storage array aligns ownership of one or more sub-LUNS for a plurality of storage controllers of the second storage array based on the first sub-LUN ownership mapping.

The processor may determine whether a sub-LUN ownership change would involve data movement from a first storage device accessible by a storage controller to a second storage device accessible by another storage controller of the second storage array. When the sub-LUN ownership change would not involve such data movement, the sub-LUNs owned by each storage controller of the second storage array are aligned to correspond with sub-LUN ownership of storage controllers of the first storage array. When the sub-LUN ownership would involve data movement, then the processors of the storage controllers coordinate the movement of data for the first storage device and the second storage device.

Ownership of sub-LUNs for the plurality of storage controllers of the second storage array may be aligned to fully match, or to partially match, the sub-LUN ownership of a plurality of storage controllers of the first storage array. A partial match, for example, may be a match of one or more sub-LUNs for a storage controller.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Examples of the subject matter claimed below will now be disclosed. In the interest of clarity, not all features of an actual implementation are described in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
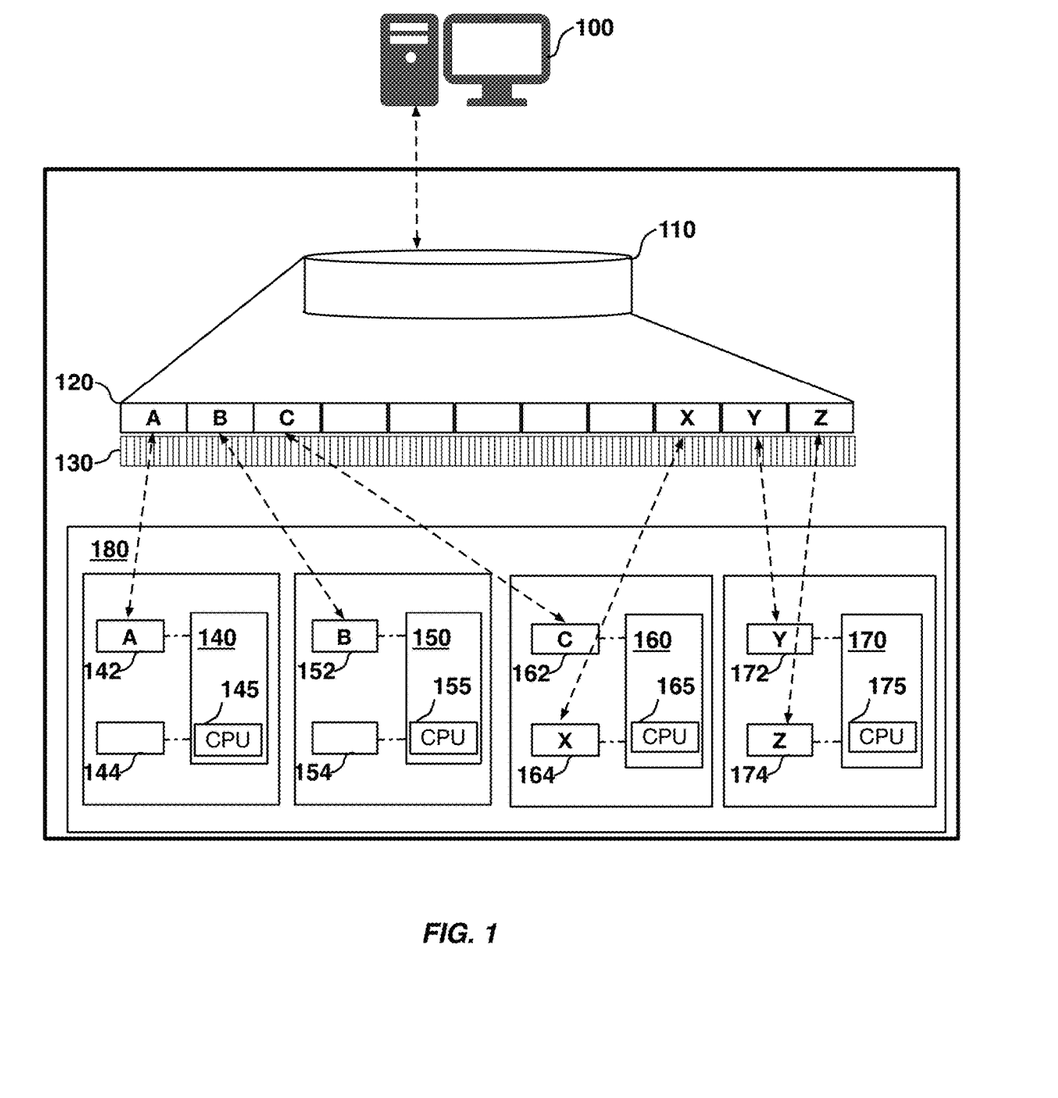
FIG. 1 is a schematic diagram of an example storage array accessed by a host computer.

Referring now to FIG. 1, a schematic of an example storage array 180 accessed by a host computer 100 is described. Storage array 180 may include multiple storage controllers 140, 150, 160, 170. The storage controllers 140, 150, 160, 170 may each include one or multiple hardware processors 145, 155, 165, 175 embedded into a respective storage controller for performing a range of functions for the storage array 180. The hardware processors 145, 155, 165, 175 may handle data operation requests, movement of data as well as other data-related functions, such as RAID and volume management. The storage controllers 140, 150, 160, 170 may have one or more input/output (I/O) paths to communicate to a computer network, to host computers, to storage devices, and/or to other storage controllers.

Hardware processors 145, 155, 165, 175 may be one or more central processing units (CPUs), semiconductor-based microprocessors, and/or other hardware devices suitable for retrieval and execution of instructions stored in a machine-readable storage medium. Hardware processors 145, 155, 165, 175 may fetch, decode, and execute instructions, to control processes for managing sub-LUN alignment. As an alternative or in addition to retrieving and executing instructions, hardware processors 145, 155, 165, 175 may include one or more electronic circuits that include electronic components for performing the functionality of one or more instructions, e.g., a Field Programmable Gate Array (FPGA) or Application Specific Integrated Circuit (ASIC).

Host computer 100 accesses data using LUN 110 as a virtual volume or virtual address space for accessing data contained on physical or virtual storage devices of the storage array 180. LUN 110 is formed from a collection of sub-LUNs that are distributed across and hosted by the storage array 180 of n storage controllers 140, 150, 160, 170. Each storage controller 140, 150, 160, 170 in the storage array 180 has target ports, processors, and memory to receive and process data operation requests from the host computer 100.

A LUN mapping table 120 maps the entire LUN's logical block range 130 to each of the sub-LUNs as depicted by the sub-LUNs A, B, C . . . X, Y, Z. In the example storage array 180, the LUN mapping table 120 is made available to each storage controller 140 so that any storage controller 140, 150, 160, 170 may offer full read/write access of the entire LUN regardless which storage controllers 140, 150, 160, 170 own which sub-LUNs. Each sub-LUN is owned (or hosted) by one storage controller 140, 150, 160, 170 in the storage array 180. For each sub-LUN owned by a given storage controller 140, 150, 160, 170, the storage controller 140, 150, 160, 170 manages input/output access to the sub-LUN, including performing input/output access to physical storage media allocated to store data for the sub-LUN (i.e., performing input/output access to the physical storage media in response to requested input/output access to the sub-LUN).

The storage controllers 140, 150, 160, 170 may process data operation requests from the host computer 100. The data operation requests may include requests to write data to the storage array 180 as well as requests to read data from the storage array 180. The storage controllers 140, 150, 160, 170 may receive read requests to read data from data storage located on a physical or virtual storage device. Additionally, the storage controllers 140, 150, 160, 170 may receive write requests to write data to onto a physical or virtual storage device. The storage controllers 140, 150, 160, 170 may include cache memory which may store some portions of the data operation requests, and any accompanying data for a write operation, so that the receiving controller 140, 150, 160, 170 may proxy a data operation request to another controller.

Each storage controller 140, 150, 160, 170 offers to the host computer 100, indirect access to the other storage controllers' 140, 150, 160, 170 sub-LUNs by way of proxying. As used herein, "proxying" may include the receipt of a data operation request to a storage controller that does not own a sub-LUN and forwarding by the receiving storage controller the data operation request to another storage controller. In proxying a data operation request, the receiving storage controller would communicate with another storage controller in the storage array, and pass the data operation request, and any accompanying data, to the storage controller that owns the sub-LUN. The storage controller originally receiving the data operation request may wait for verification, or an acknowledgement, from the storage controller owning the sub-LUN that the intended data operation request has been successfully performed. When receiving this acknowledgement, the storage controller originally receiving the data operation request, will in turn, submit a verification, or acknowledgment back to the host computer that initiated the data operation request. In the case of a data operation request in the form of a read operation, data would be read by the storage controller owning the sub-LUN and pass the read data back to the originally receiving storage controller, which in turn, will pass the read data to the host computer 100.

When a data operation request arrives at any of the storage controllers 140, 150, 160, 170, a reverse mapping of the LUN may be performed by the receiving storage controller to proxy or redirect the data operation request to the appropriate storage controller 140, 150, 160, 170 owning the sub-LUN. Each of the storage controllers may include an accessible copy of the LUN, and a sub-LUN lookup table stored in an accessible storage medium, or other memory cache. The sub-LUN lookup table may include a unique identifier for each storage controller, and the respective sub-LUNs pointers for each storage controller.

The proxying of data operation requests are performed via controller inter-links (not shown in FIG. 1). The proxying of data operation requests may result in a negative performance impact as compared to direct physical storage media access by a storage controller for a sub-LUN that it owns. The performance impact may be a result of limited inter-controller bandwidth, and/or the latency imposed by the time needed to process the data operation request and forwarding the data operation request and accompanying data from one storage controller 140, 150, 160, 170 to another storage controller.

When a given storage controller 140, 150, 160, 170 receives a data operation request from the host 100 to a specific sub-LUN that is owned by another storage controller 140, 150, 160, 170, the receiving storage controller 140, 150, 160, 170 forwards the data operation request to the storage controller 140, 150, 160, 170 owning the sub-LUN for processing and waits for a response.

After the owning storage controller (i.e., the controller responsible for the sub-LUN data operation requests) processes the data operation request and sends confirmation or an acknowledgement of successful processing, the receiving storage controller then responds back to the host.

Figure 2:
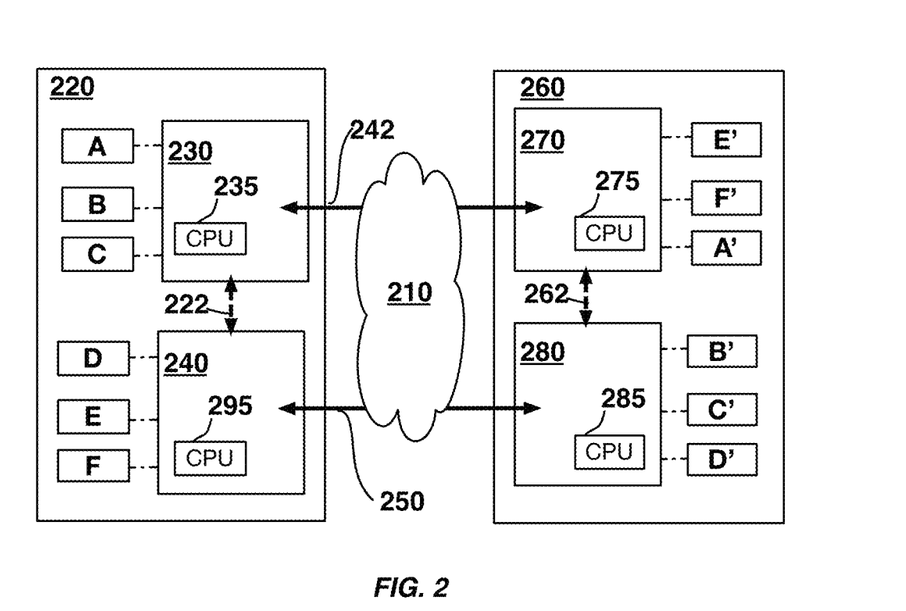
FIG. 2 is a schematic diagram of an example distributed storage system with two storage arrays with multiple storage controllers in a remote copy point-to-point configuration.

The disclosure will now turn to a discussion describing sub-LUN misalignment among storage controllers of two separate storage arrays. Referring now to FIG. 2, a schematic diagram is described of an example distributed storage system with two storage arrays 220, 260 with multiple storage controllers 230, 240 and 270, 280 in a remote copy point-to-point configuration. Each storage array 220, 260 includes two storage controllers 230, 240 and 270, 280 where each storage controller is hosting a given LUN that is made of sub-LUNs A, B, C, D, E and F on storage array 220, and replica sub-LUNs A', B', C', D', E' and F' on storage array 260, respectively. Data from the first storage array 220 is replicated to the second storage array 260. In FIG. 2, each sub-LUN has a source version (e.g., sub-LUN A) owned by a first controller of a first storage array 220, and a replica or destination version (e.g., sub-LUN A') owned by a second controller of a second storage array 260.

First storage array 220 has two storage controllers 230, 240. The first storage controller 230 owns (e.g., handles data operation requests for) sub-LUNs A, B, and C. The second storage controller 230 owns (e.g., handles data operation requests for) sub-LUNs D, E, and F. Storage controller 230 communicates with storage controller 240 via controller inter-link 222. Storage controller 230 has one or more CPUs 235. Storage controller 240 has one or more CPUs 295.

Second storage array 260 has two storage controllers 270, 280. The first storage controller 270 owns (e.g., handles data operation requests for) sub-LUNs E', F', and A'. The second storage controller 280 owns (e.g., handles data operation requests for) sub-LUNs B', C', and D'. Storage controller 270 communicates with storage controller 280 via controller inter-link 262. While two storage controllers are shown for each storage array, each storage array may have any number of storage controllers. Storage controller 270 has one or more CPUs 275. Storage controller 280 has one or more CPUs 285.

The first storage controller 230 of the first storage array 220 communicates to the first storage controller 270 of the second storage array 260. A communication link 242 connects storage controller 230 to storage controller 270 for communication of data operation requests and responses. The second storage controller 240 of the first storage array 220 communicates with the second storage controller 280 of the second storage array 260 through a communication link 250. The communication links 242, 250 provides a communication channel through a computer network 210 allowing the storage controllers to bidirectionally communicate with each other regarding data operation requests. As described herein, computer network 210, may include, for example, a storage area network (SAN), a local area network (LAN), a virtual LAN (VLAN), a wireless local area network (WLAN), a virtual private network (VPN), the Internet, or the like, or a combination thereof.

The first storage controller 230 at the first storage array 220 owns sub-LUNs A, B and C. The second storage controller 240 at the first storage array 220 owns sub-LUNs D, E and F. The first storage controller 270 at the second storage array 260 owns sub-LUNs E', F' and A'. The second storage controller 280 at the second storage array 260 owns sub-LUNs B', C' and D'.

In some examples described herein, sub-LUN misalignment may be present when, for a given set of sub-LUNs owned by a given storage controller on a first storage array 220, the replica sub-LUNs for the given set of sub-LUNs are not all owned by one corresponding storage controller that is part of a second storage array 260 and able to communicate directly with the given storage controller (i.e., without involving another storage controller at least one of the storage arrays). In the example of FIG. 2, storage controllers 230 and 270 are able to communicate with one another directly via communication link 242 (i.e., without going through any other storage controller, such as storage controller 240 or 280). The sub-LUNs are misaligned in that the first storage controller 230 owns sub-LUNs A, B, and C, but the first storage controller 270 (with which storage controller 230 may communicate directly) does not own sub-LUNs A', B', and C', but instead owns sub-LUNs E', F', and A'. The sub-LUNs are also misaligned in that the second storage controller 240 owns sub-LUNs D, E, and F, but the second storage controller 280 (with which storage controller 240 may communicate directly) does not own sub-LUNs D', E', and F', but instead owns sub-LUNs B', C', and D'.

In this example, only sub-LUNs A and A' are aligned on the first controller 230 of the first storage array 220 and the first controller 270 of the second storage array 260. Also, only sub-LUNs D and D' are aligned on the second controller 240 of the first storage array 220 and the second controller 280 of the second storage array 260. The other sub-LUNs B and B', C and C', E and E', and F and F' are misaligned on the storage controllers of the first storage array 220 and the second storage array 260.

Due to the sub-LUN misalignment, a storage controller of the second storage array 260 may need to proxy data operation requests among storage controllers 270, 280. For example, when the first storage controller 230 sends a data operation request relating to sub-LUNs A and B to first storage controller 270, first storage controller 270 would in turn need to proxy that portion of the data operation request for sub-LUN B via controller inter-link 262 to storage controller 280. In this example, there is inefficient usage of controller inter-link 262 due to the misalignment of sub-LUN ownership among the two storage controllers 230 and 270. In other words, if ownership of sub-LUNs A and A', and B and B' had been aligned between respective storage controllers on first storage array 220 and second storage array 260 (i.e., had storage controller 270 owned both sub-LUNs A' and B' for data operation requests), then proxying data from one storage controller 270 to another storage controller 280 of the second storage array 260 via controller inter-link 262 could be avoided.

However, according to methods described below, sub-LUN ownership by the storage controllers may be aligned to reduce the proxying of data between storage controllers of the same storage array. For example, the second storage controller 280 at the second storage array 260 may align ownership of sub-LUNs B' and C' to the first storage controller 270. The first storage controller 270 at the second storage array 260 may align ownership of sub-LUNs E' and F' to the second storage controller 280. The result would be ownership of sub-LUNs A', B', C' by the first controller 270, and ownership of sub-LUNs D', E', F' by the second controller 280.

Figure 3:
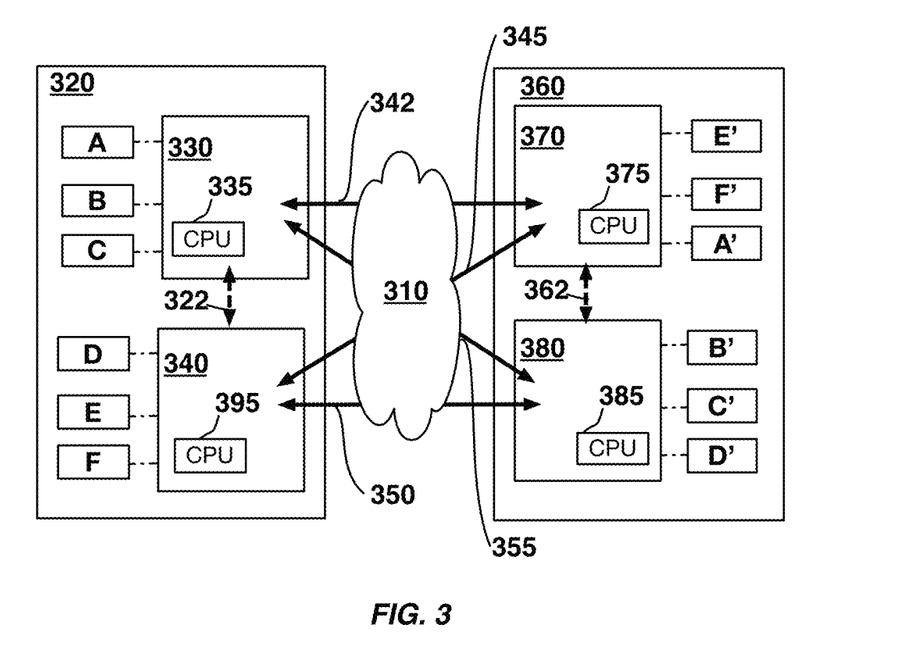
FIG. 3 is a schematic diagram of an example distributed storage system with two storage arrays with multiple storage controllers in a remote copy many-to-many configuration.

Referring now to FIG. 3, a schematic diagram is described of an example distributed storage system with two storage arrays 320, 360 with multiple storage controllers 330, 340 and 370, 380 in a remote copy many-to-many link configuration. Each storage array 320, 360 includes two storage controllers 330, 340 and 370, 380 where each storage controller is hosting a given LUN that is made of sub-LUNs A/A', B/B', C/C', D/D', E/E' and F/F'. Data from the first storage array 320 is replicated on the second storage array 360.

First storage array 320 has two storage controllers 330, 340. The first storage controller 330 handles data operation requests for sub-LUNs A, B, C. The second storage controller 340 handles data operation requests for sub-LUNs D, E, F. Storage controller 330 communicates with storage controller 340 via controller inter-link 322. Storage controller 330 has one or more CPUs 335. Storage controller 340 has one or more CPUs 395.

Second storage array 360 has two storage controllers 370, 380. The first storage controller 370 handles data operation requests for sub-LUNs E', F', A'. The second storage controller 380 handles data operation requests for sub-LUNs B', C', D'. Storage controller 370 communicates with storage controller 380 via controller inter-link 362. While two storage controllers are shown for each storage array, the storage array may have any number of storage controllers. Storage controller 370 has one or more CPUs 375. Storage controller 380 has one or more CPUs 385.

The first storage controller 330 of the first storage array 320 communicates to the first storage controller 370 of the second storage array 360. A communication link 342 connects storage controller 330 to storage controller 370. Another communication link 355 connects storage controller 330 to storage controller 380. The second storage controller 340 of the first storage array 320 communicates to the second storage controller 380 of the second storage array 360. A communication link 350 connects storage controller 340 to storage controller 380. Another communication link 345 connects storage controller 340 to storage controller 370.

The communication links 342, 345, 350, 355 provides a communication channel through a computer network 310 allowing the storage controllers to bidirectionally communicate with each other regarding data operation requests. As described herein, computer network 310, may include, for example, a storage area network (SAN), a local area network (LAN), a virtual LAN (VLAN), a wireless local area network (WLAN), a virtual private network (VPN), the Internet, or the like, or a combination thereof.

Identifiers for communication links may be stored as a table, or other data structure ("Link Table"), on a computer readable storage medium (e.g., cache memory) accessible by a storage controller. A communications link, for example, may be an address of a location of another storage controller, such as an internet protocol (IP) address, media access control (MAC) address, universal resource locator (URL), or other type of location identifier.

In this example, each storage controller 330, 340 at the first storage array 320 may access all storage controllers 370, 380 at the second storage array 360. If there are "n" storage controllers at the first storage array, and "m" storage controllers at the second storage array, each storage controller must access all n storage controllers in both the first storage array and the second storage array. This will result into configuring "n×m" communication links. This configuration consumes significant host logical connectivity at array ports.

If a failure occurs for any of the communication links 342, 355, 345, 350, or one of the communication links may be taken off-line, then the sub-LUN alignment methods described herein may be used for sub-LUN ownership alignment. The alignment of sub-LUN ownership may be performed prior to the communications links being taken off-line. For example, if communications links 345 or 355 is taken off-line, sub-LUN ownership by the storage controllers may be aligned between storage controllers of the same storage array. For example, the second storage controller 380 at the second storage array 360 may align ownership of sub-LUNs B' and C' to the first storage controller 370. The first storage controller 370 at the second storage array 360 may align ownership of sub-LUNs E' and F' to the second storage controller 380. The result would be ownership of sub-LUNs A', B', C' by the first controller 370, and ownership of sub-LUNs D', E', F' by the second controller 380.

EXAMPLE ALIGNMENT METHODS

The sub-LUN ownership alignment methods described herein may improve data operation request processing time among distributed storage arrays and reduce inter-controller cross talk among storage controllers when performing remote copy operations between storage arrays. The methods herein may be implemented by one or more processors of a storage controller executing software instructions stored on a non-transitory machine-readable storage medium, by control circuitry integrated within a storage controller, or by a host computer that may control or interact with storage controllers, or any combination thereof. For example, a method may be performed by one or more daemons or processes that may be executed on any storage controller of a first storage array, and on any storage controller of a second storage array. Additionally, a method may be performed by an independent computing device that is communicatively coupled with a storage controller of a first storage array, and a storage controller of a second storage array.

As described in the example methods below, a sub-LUN ownership mapping identifies the sub-LUN ownership among storage controllers of a storage array. The sub-LUN ownership mapping may be in an electronic form, such as a logical map, file, table, or other data structure, index, hash which includes information that identifies a storage array's storage controllers and the sub-LUNs owned by the storage controllers, respectively. The sub-LUN ownership mapping may include data values indicating storage controller identifiers, and for each storage controller identifier, may associate the storage controller identifier with the sub-LUN identifier(s) of the sub-LUN(s) owned by the storage controller identified by that storage controller identifier. The sub-LUN ownership mapping may include data values indicating media type, RAID (redundant array of independent disks) level, and sub-LUN size.

As further described below, a storage controller of a secondary storage array receives a sub-LUN ownership mapping from a storage controller of a primary storage array. The receiving storage controller compares the received sub-LUN ownership mapping to the receiving storage controller's LUN table. The receiving storage controller evaluates the sub-LUN ownership mapping and identifies where sub-LUN ownership for storage controllers of the first storage array are not aligned with sub-LUN ownership for storage controllers of the second storage array. The receiving storage controller determines an ownership alignment of the second storage array's sub-LUNs to match or partially match the sub-LUN ownership mapping for the first storage array.

After the receiving storage controller determines alignment of sub-LUN ownership of the second storage array, the receiving storage controller updates the receiving storage controller's LUN table with the determined sub-LUN ownership alignment, or alternatively the receiving storage controller creates a new LUN table, and replaces an existing LUN table with the new LUN table. The new LUN table includes the determined sub-LUN ownership alignment. The new LUN table is then transmitted to each of the other storage controllers in the second storage array, where in turn, the other storage controllers of the second storage will update their then current LUN tables with the new LUN table. In this manner, the storage controllers of the second storage array will reflect the sub-LUN ownership alignment changes.

During the updating of the LUN table, a storage controller making a change to the LUN table may temporarily and briefly pause replication services until the reconfiguration conversion is completed.

Sub-LUN ownership alignment may be prioritized before movement of data among physical storage devices. In certain storage array configurations, two or more storage controllers may have input/output access to the same physical storage device. In this configuration, alignment of a sub-LUN from one of the storage controllers to another storage controller would not involve the movement of data from the physical storage device.

In other storage array configurations, two or more storage controllers may not have input/output access to the same physical storage device. In addition to aligning sub-LUN ownership, the storage controllers of the storage array may coordinate movement of data from one physical storage device accessible by the first storage controller, to another physical storage device accessible by the second storage controller.

Additionally, when data is to be moved, the storage controllers, or a separate system, may coordinate and balance moving data among each of the storage controller of two storage arrays, rather than just moving data among storage controllers of one storage array. For example, data actually stored on a physical storage device accessible by a first storage controller may be moved to another physical storage device that is accessible by a second storage controller. In some instances while balancing movement of data, some data would be moved from one physical storage device accessible by a first storage controller to another physical storage device accessible by a second storage controller in the first storage array, and some data would be moved from one physical storage device accessible by a first storage controller to another physical storage device accessible by a second storage controller in the second storage array.

The alignment of the sub-LUNs ownership among the storage arrays may occur based on a triggering event. For example, alignment may occur when there is a hardware configuration change, hardware failure, link failure or any other triggering event that may result in a sub-LUN ownership change. Additionally, an analytics engine as described below may execute software instructions, such as a daemon or service, to monitor the storage arrays and determine that a sub-LUN alignment is needed, or beneficial to optimize remote data copying among the storage arrays.

Figure 4:
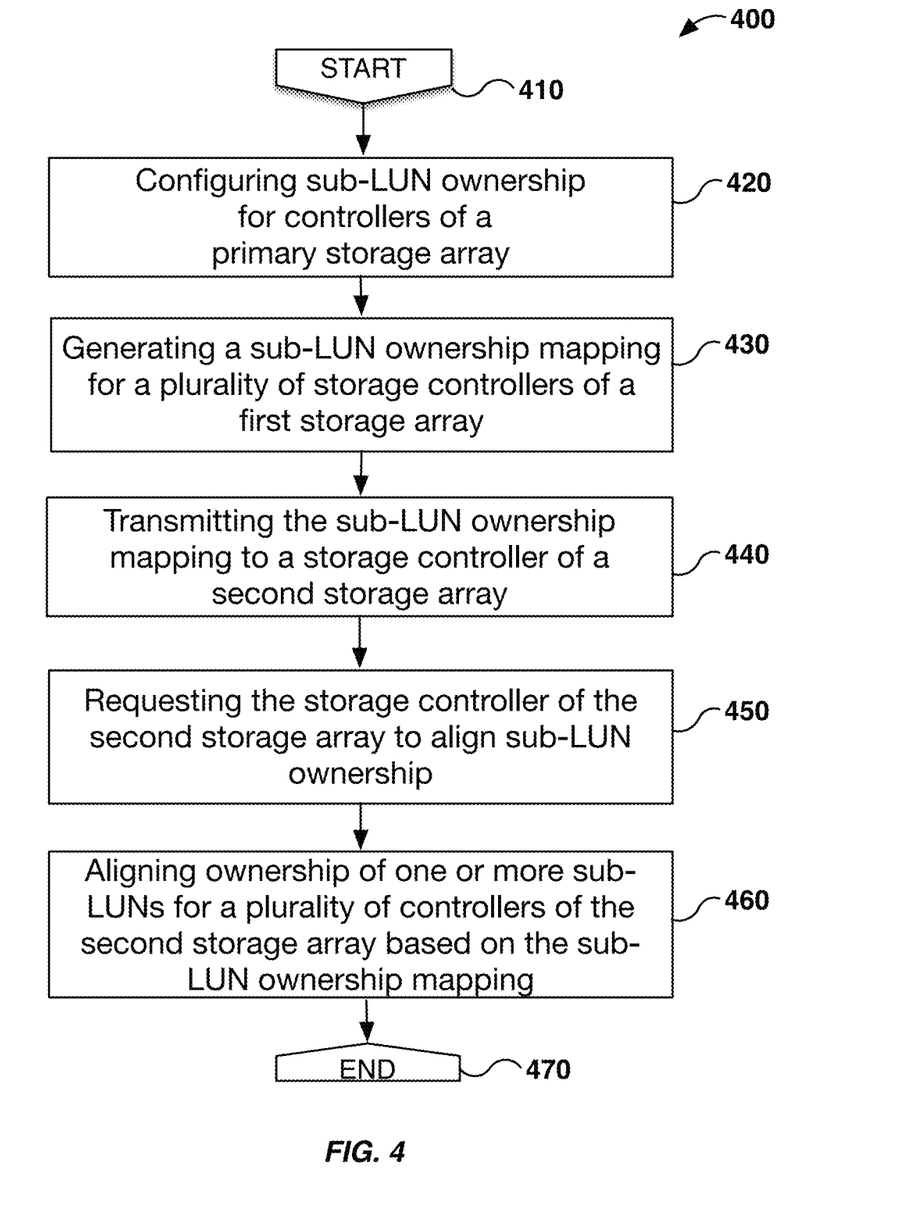
FIG. 4 is a flowchart of an example method for sub-LUN ownership alignment.

Referring now to FIG. 4, a method 400 for sub-LUN ownership alignment is described. The method 400 begins (block 410) with configuring a first storage array's LUN(s) and sub-LUN ownership for the storage controllers of the first storage array (block 420). A sub-LUN ownership mapping for storage controllers of the first storage array is generated (block 430). Each storage controller of a storage array has accessible to the storage controller, a LUN table that identifies each sub-LUN and the particular storage controller that manages data operations with respect to the sub-LUN. The LUN table may be stored in a storage cache and/or memory of a respective storage controller. Each storage controller of a storage array has a copy of the LUN table.

Any storage controller of a storage array may generate a sub-LUN ownership mapping. In one example, the sub-LUN ownership mapping is generated by a first storage controller of a first storage array by making a duplicate copy of its LUN table. The copied LUN table may be used as the sub-LUN ownership mapping and may be transmitted by the first storage controller of the first storage array to a first storage controller of a second storage array. In another example, the first storage controller reads data from the LUN table and creates a sub-LUN ownership mapping with a subset of information from the LUN table. In this example, the sub-LUN ownership mapping may include respective identifiers for the storage controllers of the storage array, and the sub-LUNs associated with the respective identifiers. For readability, the first storage controller of the first storage array will be referred to as the Sending Controller, and the first storage controller of the second storage array will be referred to as the Receiving Controller.

The sub-LUN ownership mapping is transmitted by the Sending Controller to a Receiving Controller (block 440). A request is sent by the Sending Controller to the Receiving Controller to align the sub-LUN (block 450). For example, this request may be a command or instructions that may be interpreted by the Receiving Controller. The Receiving Controller in response to receiving the command or instructions then performs ownership alignment as described herein with reference to the received sub-LUN ownership mapping.

Additionally, a request may be sent by the Sending Controller to Receiving Controller to match (or attempt the closest match) to the sub-LUN ownership mapping with respect to one or more parameters for a media type, RAID (redundant array of independent disks) level, and sub-LUN size. The Receiving Controller in response to receiving the request will also adjust sub-LUNs on the second storage array to try to match the parameters when aligning sub-LUNs.

Alignment of ownership for a plurality of controllers of the second storage array is performed based on processing the received sub-LUN ownership mapping (block 460). The Receiving Controller compares the received sub-LUN ownership mapping with the Receiving Controller's LUN table. For example, the Receiving Controller may sequentially read through the received sub-LUN ownership mapping and read through the Receiving Controller's LUN table. The Receiving Controller may create a temporary table in memory where a sub-LUN is identified as matching for a storage controller of the first storage array and for a storage controller of a second storage array. The temporary table in memory may also include identification of sub-LUNs as not matching for a storage controller of the first storage array and for a storage controller of a second storage array. The identified non-matching sub-LUNs of the second storage array may be aligned with corresponding sub-LUN of the first storage array. In other words, a non-matching sub-LUN may be associated or moved in the temporary table to another controller of the second storage array.

The temporary table may then be used by Receiving Controller to update the LUN table for the second storage array. The Receiving Controller may reorganize the Receiving Controller's LUN table according to the alignment identified in the temporary table. The updated LUN table is then replicated to other storage controllers of the second storage array. The method then ends (block 470).

In certain storage array configurations, the Receiving Controller may not be able to align the sub-LUN ownership. For example, data associated with a sub-LUN to be aligned may be stored on a physical storage device and due to data size constraints, and space availability, the data cannot be moved along with the sub-LUN from one storage controller to another storage controller. The Receiving Controller may send a communication to the originating storage controller of the first storage array (i.e., the Sending Controller) that the alignment of sub-LUNs was unsuccessful and request another sub-LUN ownership mapping strategy or a new mapping plan. In response, the Sending Controller may accept and execute the requested mapping strategy or generate a different sub-LUN ownership mapping and resend to the Receiving Controller for ownership alignment of sub-LUNs.

The alignment of the sub-LUN ownership on the second storage array may be performed such that the ownership of the sub-LUNs for each storage controller of the second storage array matches the sub-LUN ownership of each other (e.g., such that the misalignment of sub-LUN ownership, as described above, is removed). For example, if both the first and second storage arrays had four storage controllers, then the sub-LUNs would be aligned so that a first storage controller for each storage arrays has corresponding sub-LUN ownership, a second storage controller for each storage arrays has corresponding sub-LUN ownership, and a third storage controller for each storage arrays has corresponding sub-LUN ownership, and so forth with the remaining storage controllers in the storage arrays.

Figure 5:
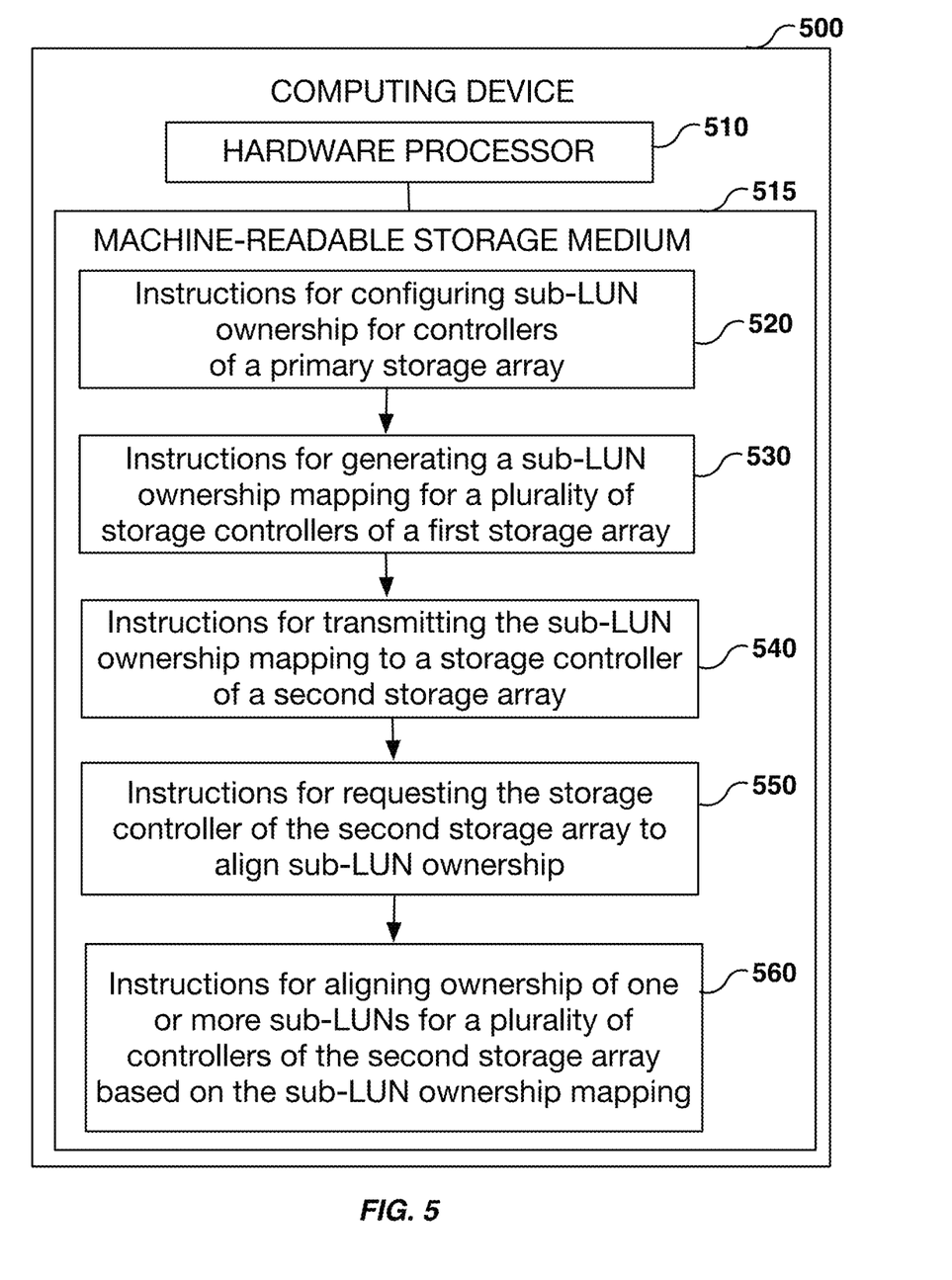
FIG. 5 is an example computing device and a machine-readable storage medium storing instructions for sub-LUN ownership alignment.

Referring now to FIG. 5, an example computing device 500 and a machine-readable storage medium 515 storing instructions for performing sub-LUN ownership alignment is described. A computing device 500 comprising a hardware processor 510 may execute instructions stored on a non-transitory computer storage device 515. The instructions of the machine-readable storage medium 515 are an implementation of the method described with regard to FIG. 4.

A machine-readable storage medium, such as 515, may include both volatile and nonvolatile, removable and non-removable media, and may be any electronic, magnetic, optical, or other physical storage device that contains or stores executable instructions, data structures, program modules, or other data accessible to processor 510, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals. The machine-readable storage medium may be encoded with executable instructions 520-560, for performing a method for sub-LUN alignment according to the methods described herein. The machine-readable storage medium 515 may be located in a storage controller, a host computer and/or in another device or system in communication with the storage array.

Figure 6:
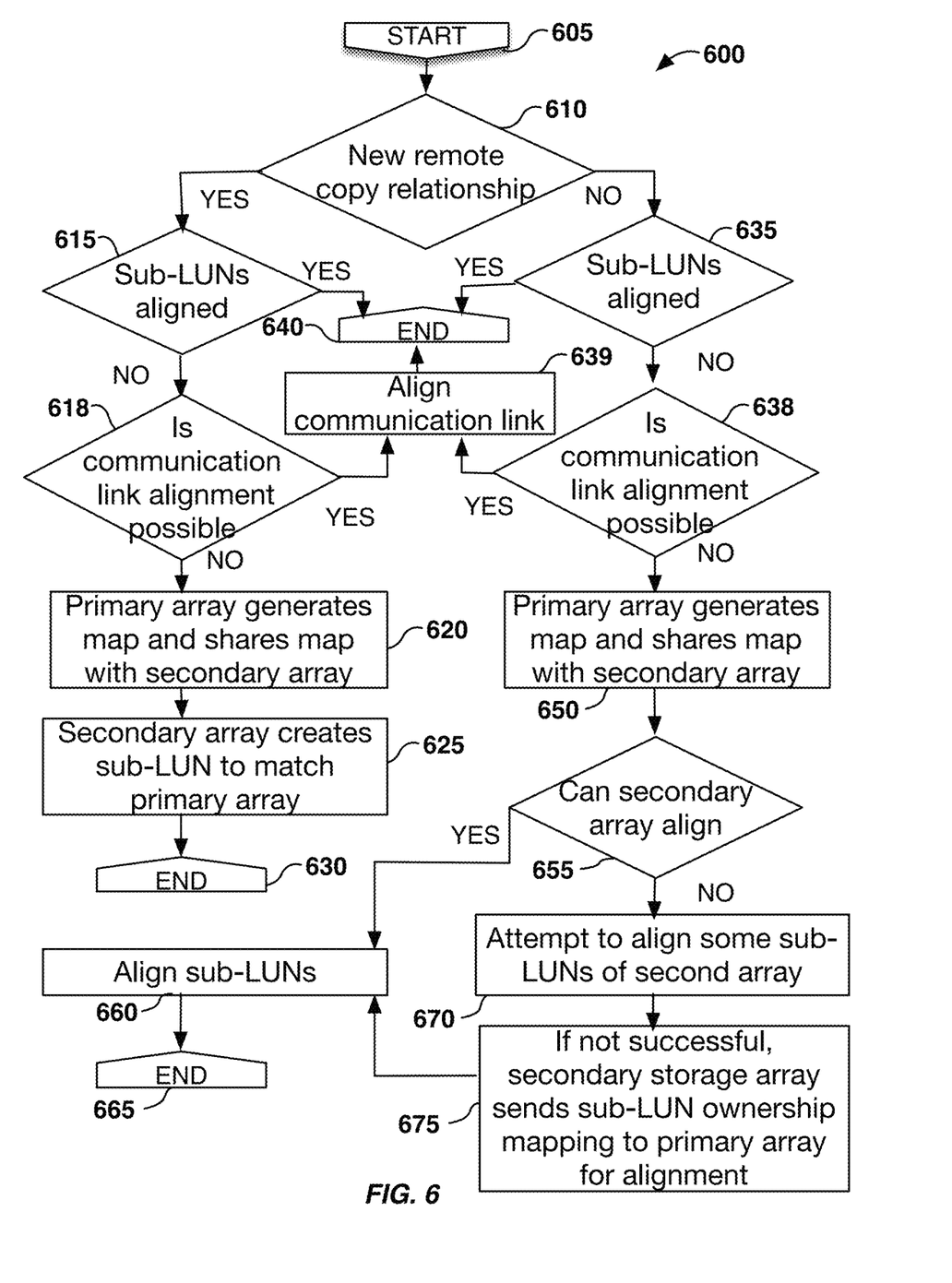
FIG. 6 is a flow chart of an example method for sub-LUN ownership alignment.

Referring now to FIG. 6, an example method for sub-LUN ownership alignment is further described. The example method begins (block 605) and a processor, or other operative process or control circuitry, determines if there is a new remote copy relationship between a first storage array and a second storage array (block 610). For example, the processor may be a separate computing device communicatively coupled to one or more storage controllers of a storage array and communicatively coupled to one or more storage controllers of a second storage array. The processor may be integral to a storage controller and/or may be one or more processors of a separate computing device(s).

When the processor determines that there is not a new remote copy relationship, then the processor determines if the sub-LUNs are aligned among the storage controllers of the first and second storage array (block 635). For example, the processor may read a LUN table for the first storage array, and a LUN table for the second storage array. The processor may compare the two LUN tables and determine whether there is sub-LUN ownership alignment among the storage controllers of the first and second storage arrays.

The method ends (block 640) when the processor determines that sub-LUN ownership are aligned. In other words, the sub-LUN ownership completely matches, or partially matches ownership of two or more sub-LUNs, for storage controllers on both arrays. For example a match may occur when a first storage controller of the first array owns sub-LUNs A, B, C, and a first storage controller of the second array owns sub-LUNs A', B', C'; and a second storage controller of the first storage array owns sub-LUNs D, E, F, and second storage controller of the second array owns sub-LUNs D', E', F'.

When the processor determines a new remote copy relationship exists (block 610), then the processor determines whether there is a sub-LUN ownership alignment or match among the respective storage controllers for the first and second storage arrays (block 615). For example, the processor may read a LUN table for the first storage array, and a LUN table for the second storage array. The processor may compare the two LUN tables and determine whether there is sub-LUN ownership alignment among the storage controllers of the first and second storage arrays.

If there is sub-LUN ownership alignment or a match, then the method ends (block 640). If there is not a sub-LUN ownership alignment, then the processor may determine if there is a possible change that can be made to take advantage of existing communication link alignment (block 618). The processor may determine that an existing communication link is not used for inter-controller communication between controllers of the first and second storage arrays with the same sub-LUN ownership. If use of an existing communication link can be made, the storage controller will make the change (block 639) to use the alternate communication link than the previously communication link the storage controller was using.

For example, sub-LUN A may be located on controller 1 of a first storage array, and sub-LUN A' may be located on controller 2 of the second storage array. However, controller 1 of the first storage array may be using a communication link other than a communication link from controller 1 of the first storage array to controller 2 of the second storage array for data operations related to sub-LUN A and sub-LUN A'. The processor may determine if a communication link exists between controller 1 of the first storage array and controller 2 of the second storage array. If the communication link exists, then data operations related to sub-LUN A and sub-LUN A' would then be changed to use the communication link between controller 1 of the first storage array and controller 2 of the second storage array. Then the method ends (block 640).

If there is not a communication link alignment, then a storage controller of the first storage array generates a sub-LUN ownership mapping (block 620). As discussed previously, each storage controller of a storage array has access to the storage controller, a LUN table that identifies each sub-LUN and the particular storage controller that manages data operations with respect to the sub-LUN. The LUN table may be stored in a storage cache and/or memory of a respective storage controller. Each storage controller of a storage array has a copy of the LUN table.

Any storage controller of a storage array may generate a sub-LUN ownership mapping. In one example, the sub-LUN ownership mapping is generated by a storage controller by making a duplicate copy of its LUN table. The copied LUN table may be used as the sub-LUN ownership mapping for transmission to the second storage array. In another example, the storage controller reads data from the LUN table, and creates a sub-LUN ownership mapping with a subset of information from the LUN table. In this example, the sub-LUN ownership mapping may include respective identifiers for the storage controllers of the storage array, and the sub-LUNs associated with the respective identifiers.

The sub-LUN ownership mapping identifies the storage controllers for the first storage array, and which sub-LUNs are owned by which storage controllers. The sub-LUN ownership mapping generated by the first storage array is then shared with the second storage array. A storage controller of the second storage array receives the sub-LUN ownership mapping from the first storage array.

The second storage array then aligns ownership of the sub-LUNs for its storage controllers to match, or to partially match ownership of two or more sub-LUNs, the sub-LUN ownership of the first storage array (block 625).

The storage controller of the second storage array compares the received sub-LUN ownership mapping with the storage controller's LUN table. For example, the receiving storage controller may sequentially read through the received sub-LUN mapping table, and through the storage controller's own LUN table. The storage controller may create a temporary table in memory where a sub-LUN is identified as matching for a storage controller of the first storage array and for a storage controller of a second storage array. The temporary table in memory may also include identification of sub-LUNs as not matching for a storage controller of the first storage array and for a storage controller of a second storage array. The identified non-matching sub-LUNs of the second storage array may be aligned with corresponding sub-LUN of the first storage array. In other words, a non-matching sub-LUN may be associated or moved in the temporary table to another controller of the second storage array.

The temporary table may then be used by the storage controller to update the LUN table for the second storage array. The second storage controller would reorganize the second controller's LUN table according to the alignment identified in the temporary table. The updated LUN table would be replicated to other storage controllers of the second storage array. Then the method ends (block 630).

Alternatively, both the first and second storage arrays may change a portion of sub-LUN ownership to complement the other array's sub-LUN ownership until a complete match is achieved. This sub-LUN ownership mapping exchange may be performed in multiple steps where the second storage array aligns the second storage controller sub-LUNs based on a received sub-LUN ownership mapping for the first storage array. Where the second storage array cannot completely match sub-LUN ownership to that of the first storage array, the second storage array aligns as many sub-LUNs as it can. The second storage array then updates its LUN table based on the aligned sub-LUNs. The second storage array may then generate a sub-LUN ownership mapping and transmit the sub-LUN ownership mapping to the first storage array. The first storage array then attempts to realign the remaining non-matching sub-LUNs and updates its LUN table based on the aligned sub-LUNs.

If the processor determines that a new remote copy relationship did not exist (block 610), then the processor determines whether the sub-LUNs are aligned (block 635). Determination of whether sub-LUNs are aligned may be performed in the manner discussed above with regard to block 615. If there is sub-LUN ownership alignment or a match, then the method ends (block 640). If there is not a sub-LUN ownership alignment, then the processor determines if there a possible change can be made to take advantage of communication link alignment (block 638). Determination of whether a communication link alignment change can be made may be performed in the manner discussed above with regard to block 618. If a communication link alignment change can be made, the controller will make the change (block 639), then the method ends (block 640). If there is not a communication link alignment, then a storage controller of the first storage array generates a sub-LUN ownership mapping (block 650). The generation of the sub-LUN ownership mapping would be performed in the manner previously discussed. The first storage array shares the sub-LUN ownership mapping with a storage controller of the second storage array (block 650).

The storage controller of the second storage array, based on comparison of the sub-LUN ownership mapping to the second storage controller's LUN table determines whether the second storage controller can align the sub-LUNs to match, or partially match ownership of two or more sub-LUNs, of the first storage array's sub-LUN ownership mapping (block 655). If the second storage array can align, then the second storage array aligns the sub-LUNs for the storage controllers of the second storage array (block 660), and then the method ends (block 665). If the second storage array cannot align the sub-LUNs to match the ownership mapping of the first array, then the second storage array attempt to align ownership of some of the sub-LUNs of the storage controllers of the second storage array (block 670).

In certain situations, the storage controller of the second storage array may not be able to align all the sub-LUN ownership. For example, data associated with a sub-LUN to be aligned may be stored on a physical storage device and due to data space requirements or other restriction, the data cannot be moved along with the sub-LUN from one storage controller to another storage controller. The second storage controller would align sub-LUN ownership for some of the sub-LUNs, and then update the LUN table for the second storage array. The storage controller of the second storage array may generate a sub-LUN ownership mapping based on the updated LUN table. This sub-LUN ownership mapping would reflect the sub-LUN ownership that the second storage array was able to realign. The first storage controller of the second storage array may transmit the sub-LUN ownership mapping to a storage controller of the second storage array (block 675). The first storage controller of the first storage array may then attempt to align sub-LUNs according to the received sub-LUN ownership mapping (block 660). Then the method ends (block 665).

Alternatively, if a sub-LUN ownership alignment is unsuccessful, or not possible, then a user or an analytics engine as described below, may determine a sub-LUN ownership mapping for both the first storage array and the second storage array. For example, ownership of sub-LUNs on the first storage array may be aligned, and ownership of sub-LUNs on the second storage array may be aligned.

Analytics Engine

An analytics engine, such as a software program, process or module, may monitor the storage arrays and evaluate historical information about the sub-LUN ownership and observe data traffic for respective sub-LUNs between storage controllers of separate storage arrays, and between storage controllers within a storage array. As used herein, the analytics engine may be any combination of hardware and programming to implement the functionalities of the analytics engine described herein. In some examples, the functionalities of the analytics engine may be at least partially implemented in the form of electronic circuitry, processor executable instructions stored on a machine-readable storage medium, or a combination thereof.

A storage controller may be configured to receive instructions and/or commands from an analytics engine. The analytics engine may request a sub-LUN ownership mapping from a storage controller. In response to the request, the storage controller may generate a sub-LUN ownership mapping and transmit the sub-LUN ownership mapping to the analytics engine. The analytics engine for example, may request a sub-LUN ownership mapping from a storage controller of a first storage array, and may request a sub-LUN ownership mapping from a second storage controller of a second storage array.

The analytics engine may determine a sub-LUN ownership mapping where sub-LUNs of a first storage array are moved among the storage controllers of the first storage array, and where sub-LUNs of a second storage array are moved among the storage controllers of the second storage array. Additionally, the analytics engine may determine that data stored on a physical storage device accessible by a storage controller may be moved to another storage controller of a storage array.

The analytics engine may then send instructions to respective storage controllers of the storage arrays to align ownership of sub-LUNs, and optionally move data from one physical storage device to another physical storage device.

The analytics engine may evaluate data traffic throughput for a communications link, the history of communication link failure and other parameters. The storage controllers may be configured with an API (application programming interface) that allows a storage controller to receive commands to move ownership of the sub-LUNs among the storage controllers of a storage array. Also, the storage controller may receive a sub-LUN ownership mapping from a remote source, such as the analytics engine or through the API from another program or system. This allows the storage controller to receive a sub-LUN ownership mapping for sub-LUN alignment from another source.

The analytics engine may determine that a communications link is going to be broken for maintenance, as determined by scheduled or predictive analytics software. The sub-LUN ownership for a storage array may then be reconfigured on a temporary basis while the maintenance is performed. For example, if inter-array communication links will be pulled or placed off-line, the sub-LUN ownership may be temporarily reconfigured, and then the communication links disabled. When the communication links are operative again, the sub-LUN ownership may be reconfigured to the original sub-LUN ownership mapping.

The foregoing description, for purposes of explanation, used specific nomenclature to provide a thorough understanding of the disclosure. However, it will be apparent to one skilled in the art that the specific details are not needed to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

We claim:

1. A method for sub-LUN (Logical Unit Number) alignment, the method comprising:
   generating a first sub-LUN ownership mapping for a plurality of storage controllers of a first storage array, the first sub-LUN ownership mapping indicating ownership of sub-LUNs by the plurality of storage controllers of the first storage array;
   transmitting the first sub-LUN ownership mapping to a storage controller of a second storage array;
   requesting the storage controller of the second storage array to align sub-LUN ownership; and
   aligning ownership of one or more sub-LUNs for a plurality of storage controllers of the second storage array based on the first sub-LUN ownership mapping.

2. The method of claim 1, wherein aligning further comprises:
   determining whether a sub-LUN ownership change would involve data movement from a first storage device accessible by a storage controller to a second storage device accessible by another storage controller of the second storage array; and
   when the sub-LUN ownership change would not involve such data movement, aligning the sub-LUNs owned by each storage controller of the second storage array to align with corresponding sub-LUN ownership of storage controllers of the first storage array.

3. The method of claim 1, wherein aligning further comprises:
   determining whether a sub-LUN ownership change would involve data movement from a first storage device accessible by a storage controller to second storage device accessible by another storage controller in the second storage array; and
   when the sub-LUN ownership would involve data movement, then moving data between the first storage device and the second storage device.

4. The method of claim 1, wherein aligning further comprises:
   aligning ownership of sub-LUNs for the plurality of storage controllers of the second storage array to match the sub-LUN ownership of the plurality of storage controllers of the first storage array.

5. The method of claim 1, wherein aligning further comprises:
   aligning ownership of sub-LUNs for the plurality of storage controllers of the second storage array to at least partially align the sub-LUN ownership of the plurality of storage controllers of the first storage array.

6. The method of claim 1, wherein a sub-LUN ownership mapping comprises an electronic data file identifying a plurality of storage controllers and respective sub-LUNs the storage controller owns for read/write operations.

7. The method of claim 1, the method further comprising:
   configuring a sub-LUN ownership for storage controllers of the first storage array prior to generating the first sub-LUN ownership mapping.

8. A data storage system comprising one or more processors, and a computer storage media storing instructions, that when executed by the one or more processors, cause the one or more processors to:
   generate a first sub-LUN (Logical Unit Number) ownership mapping for a plurality of storage controllers of a first storage array, the first sub-LUN ownership mapping indicating ownership of sub-LUNs by the plurality of storage controllers of the first storage array;
request a storage controller of a second storage array to align sub-LUN ownership; and
align ownership of one or more sub-LUNs for a plurality of storage controllers of the second storage array based on the first sub-LUN ownership mapping.

9. The data storage system of claim 8, wherein the instructions further cause the one or more processors to:
determine whether a sub-LUN ownership change would involve data movement from a first storage device accessible by a storage controller to a second storage device accessible by a storage controller of the second storage array; and
when the sub-LUN ownership change would not involve such data movement, align the sub-LUNs owned by each storage controller of the second storage array to align with corresponding sub-LUN ownership of storage controllers of the first storage array.

10. The data storage system of claim 8, wherein the instructions further cause the one or more processors to:
determine whether a sub-LUN ownership change would involve data movement from a first storage device accessible by a storage controller to a second storage device accessible by another storage controller in the second storage array; and
when the sub-LUN ownership would involve data movement, then moving data between the first storage device and the second storage device.

11. The data storage system of claim 8, wherein the instructions further cause the one or more processors to:
align ownership of sub-LUNs for the plurality of storage controllers of the second storage array to match the sub-LUN ownership of the plurality of storage controllers of the first storage array.

12. The data storage system of claim 8, wherein the instructions further cause the one or more processors to:
align ownership of sub-LUNs for the plurality of storage controllers of the second storage array to partially align the sub-LUN ownership of the plurality of storage controllers of the first storage array.

13. The data storage system of claim 8, wherein a sub-LUN ownership mapping comprises an electronic data file identifying a plurality of storage controllers and respective sub-LUNs the storage controller owns for read/write operations.

14. The data storage system of claim 8, wherein the instructions further cause the one or more processors to:
configure a sub-LUN ownership for storage controllers of the first storage array prior to generating the first sub-LUN ownership mapping.

15. A non-transitory computer storage device storing instructions operable to cause one or more computer processors to perform operations comprising:
receiving by a first storage controller of a second storage array, a first sub-LUN (Logical Unit Number) ownership mapping for a plurality of storage controllers of a first storage array, the first sub-LUN ownership mapping indicating ownership of sub-LUNs by the plurality of storage controllers of the first storage array;
receiving by the first storage controller of the second storage array, a request to align sub-LUN ownership according to the first sub-LUN ownership mapping; and
aligning ownership of one or more sub-LUNs for a plurality of storage controllers of the second storage array based on the first sub-LUN ownership mapping.

16. The non-transitory storage device of claim 15, the operations further comprising:
determining whether a sub-LUN ownership change would involve data movement from a first storage device accessible by a storage controller to a second storage device accessible by another storage controller of the second storage array; and
when the sub-LUN ownership change would not involve such data movement, aligning the sub-LUNs owned by each storage controller of the second storage array to align with corresponding sub-LUN ownership of storage controllers of the first storage array.

17. The non-transitory storage device of claim 15, the operations further comprising:
determining whether a sub-LUN ownership change would involve data movement from a first storage device accessible by a storage controller to a second storage device accessible by another storage controller in the second storage array; and
when the sub-LUN ownership would involve data movement, then moving data between the first storage device and the second storage device.

18. The non-transitory storage device of claim 15, the operations further comprising:
aligning ownership of sub-LUNs for the plurality of storage controllers of the second storage array to match the sub-LUN ownership of the plurality of storage controllers of the first storage array.

19. The non-transitory storage device of claim 15, the operations further comprising:
aligning ownership of sub-LUNs for the plurality of storage controllers of the second storage array to partially align the sub-LUN ownership of the plurality of storage controllers of the first storage array.

20. The non-transitory storage device of claim 15, wherein a sub-LUN ownership mapping comprises an electronic data file identifying a plurality of storage controllers and respective sub-LUNs the storage controller owns for read/write operations.

* * * * *